United States Patent
Ravi et al.

(10) Patent No.: US 9,631,132 B2
(45) Date of Patent: Apr. 25, 2017

(54) MITIGATING ANNULAR PRESSURE BUILDUP USING TEMPERATURE-ACTIVATED POLYMERIC PARTICULATES

(71) Applicant: Halliburton Energy Services, Inc., Houston, TX (US)

(72) Inventors: Krishna M. Ravi, Kingwood, TX (US); Brittney N. Guillory, Houston, TX (US); Peter James Boul, Houston, TX (US); Ashok K. Santra, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 253 days.

(21) Appl. No.: 13/939,581

(22) Filed: Jul. 11, 2013

(65) Prior Publication Data
US 2015/0013988 A1 Jan. 15, 2015

(51) Int. Cl.
| | | |
|---|---|---|
| *E21B 33/13* | (2006.01) | |
| *C09K 8/40* | (2006.01) | |
| *C09K 8/035* | (2006.01) | |
| *C08L 25/06* | (2006.01) | |

(52) U.S. Cl.
CPC .............. *C09K 8/40* (2013.01); *C09K 8/035* (2013.01); *C08L 25/06* (2013.01)

(58) Field of Classification Search
CPC ........ E21B 33/068; E21B 33/13; C09K 8/424
See application file for complete search history.

(56) References Cited

U.S. PATENT DOCUMENTS

| | | |
|---|---|---|
| 6,832,651 B2 | 12/2004 | Ravi et al. |
| 7,096,944 B2 | 8/2006 | Vargo, Jr. et al. |
| 7,178,590 B2 | 2/2007 | Vargo, Jr. et al. |
| 7,264,053 B2 | 9/2007 | Vargo, Jr. et al. |
| 7,290,613 B2 | 11/2007 | Santra et al. |
| 7,325,611 B2 | 2/2008 | Santra et al. |
| 7,438,758 B2 | 10/2008 | Santra et al. |
| 7,441,599 B2 | 10/2008 | Hermes et al. |
| 7,449,062 B2 | 11/2008 | Santra et al. |
| 7,510,005 B2 | 3/2009 | Coates et al. |

(Continued)

FOREIGN PATENT DOCUMENTS

| | | |
|---|---|---|
| WO | 2006-100491 | 9/2006 |
| WO | 2009-153547 | 12/2009 |
| WO | 2011-060897 | 5/2011 |

OTHER PUBLICATIONS

Halliburton Product Brochure entitled "Tuned Spacer™ III Optimized Rheology Spacer," Dated Apr. 2007.

(Continued)

*Primary Examiner* — Catherine Loikith
(74) *Attorney, Agent, or Firm* — Craig W. Roddy; Tumey L.L.P.

(57) ABSTRACT

A variety of methods and compositions, including, in one embodiment, a method that comprises providing a treatment fluid comprising a carrier fluid and temperature-activated polymeric particulates. The temperature-activated polymeric particulates may include a compressible gas trapped in the temperature-activated polymeric particulates. The method may further comprise introducing the treatment fluid into a well bore annulus.

20 Claims, 8 Drawing Sheets

(56) References Cited

U.S. PATENT DOCUMENTS

| | | | |
|---|---|---|---|
| 7,530,396 B1* | 5/2009 | Reddy | C04B 24/163 166/293 |
| 7,543,642 B2 | 6/2009 | Reddy et al. | |
| 7,743,830 B2 | 6/2010 | Hermes et al. | |
| 7,749,942 B2* | 7/2010 | Ravi | C09K 8/03 175/65 |
| 7,870,905 B2 | 1/2011 | Hermes et al. | |
| 7,913,757 B2 | 3/2011 | Reddy et al. | |
| 7,950,460 B2 | 5/2011 | Hermes et al. | |
| 7,963,333 B2 | 6/2011 | Hermes et al. | |
| 8,080,498 B2 | 12/2011 | Shepherd et al. | |
| 8,183,186 B2 | 5/2012 | Luo et al. | |
| 8,202,824 B2 | 6/2012 | Reddy et al. | |
| 2005/0124499 A1 | 6/2005 | Shinbach et al. | |
| 2006/0217270 A1 | 9/2006 | Vargo et al. | |
| 2007/0027036 A1 | 2/2007 | Polizzotti et al. | |
| 2007/0114033 A1* | 5/2007 | Hermes | C09K 8/42 166/295 |
| 2007/0114034 A1 | 5/2007 | Coates et al. | |
| 2008/0223576 A1 | 9/2008 | Coates et al. | |
| 2009/0133878 A1 | 5/2009 | Hermes et al. | |
| 2010/0113310 A1* | 5/2010 | Shepherd | E21B 41/00 507/219 |
| 2010/0163236 A1 | 7/2010 | Hermes et al. | |
| 2010/0236780 A1 | 9/2010 | Hermes et al. | |
| 2010/0314118 A1* | 12/2010 | Quintero | C09K 8/035 166/308.1 |
| 2011/0120716 A1 | 5/2011 | Williams et al. | |

OTHER PUBLICATIONS

Search Report and Written Opinion for application PCT/US2014/046174 dated Oct. 28, 2014.

* cited by examiner

MITIGATING ANNULAR PRESSURE BUILDUP USING TEMPERATURE-ACTIVATED POLYMERIC PARTICULATES

BACKGROUND

Embodiments relate to well bore treatments and, more particularly, in certain embodiments, use of polymeric particulates that are temperature activated to mitigate problems with annular pressure buildup in subterranean wells.

Spacer fluids are often used in subterranean operations to facilitate improved displacement efficiency when introducing new fluids into a well bore. For example, a spacer fluid can be used to displace a fluid in a well bore before introduction of another fluid. When used for drilling fluid displacement, spacer fluids can enhance solids removal as well as separate the drilling fluid from a physically incompatible fluid. For instance, in well cementing operations, the spacer fluid may be placed into the well bore to separate the cement composition from the drilling fluid. If the spacer fluid does not adequately displace the drilling fluid, the cement composition may fail to bond to the pipe string and/or the formation to the desired extent. Spacer fluids also may be placed between different drilling fluids during drilling change outs or between a drilling fluid and a completion brine, for example.

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the well bore annulus, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion.

Hydrocarbon production from the subterranean well may be initiated at some point in time after the cementing operation is complete. For example, hydrocarbons may be produced at the surface after flowing into the well bore and up through the pipe string. These hydrocarbons (e.g., oil, gas, etc.) may be at elevated temperatures as they flow through up through the casing/tubing, thus transferring heat through the pipe string into the well bore annulus. This may cause fluids in the well bore annulus to expand. For example, spacer fluids remaining in the well bore annulus above the cement sheath may heat and expand. Such an expansion may cause an increase in pressure within the well bore annulus, which is commonly referred to as "annular pressure buildup." Annular pressure buildup typically occurs when the annular volume is fixed. For instance, the well bore annulus may be closed (e.g., trapped) to isolate fluids in the well bore annulus from outside the annulus. Closing the well bore annulus typically occurs near the end of the cementing operation after well completion fluids such as spacer fluids and cement compositions are in place. By way of example, the well bore annulus may be closed by closing a valve, energizing a seal, and the like. However, if a fluid is trapped in the closed well bore annulus experiences a temperature increase, a large pressure increase may be expected because the volume in the well bore annulus is fixed. In some instances, this pressure increase may cause damage to the well bore, such as damage to the cement sheath, casing, tubulars, or other equipment in the well bore.

A number of different techniques have been used to combat annular pressure buildup, including use of a syntactic foam wrapping on the casing, placing nitrified spacer fluids above the cement in the annulus, placing rupture disks in an outer casing string, designing "shortfalls" in the primary cementing operations such as designing the top of the cement column in an annulus to be short of the previous casing shoe, using hollow spheres, and others. However, such methods have drawbacks. For instance, the syntactic foam may cause flow restrictions during primary cementing of the casing within the wellbore. In addition, the syntactic foam may detach from the casing and/or become damaged as the casing is installed. Drawbacks with placing the nitrified spacer fluids include logistical difficulties (e.g., limited room for the accompanying surface equipment), pressure limitations on the well bore, and the typical high expenses related thereto. Further drawbacks with placing the nitrified spacer fluids include loss of returns when circulating the nitrified spacer into place and in situations wherein the geographic conditions provide difficulties in supplying the proper equipment for pumping the nitrified spacer. Additional drawbacks include the rupture disks so comprising the casing string after failure of the disks that continuing well bore operations may not be able to proceed. Further drawbacks include the designed "shortfall," which may not occur due to well bore fluids not being displaced as designed and cement channeling up to a casing shoe and trapping it. Moreover, problems with the hollow spheres include the spheres failing before placement in the annulus and inability to withstand repeated changes in pressure/temperature.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
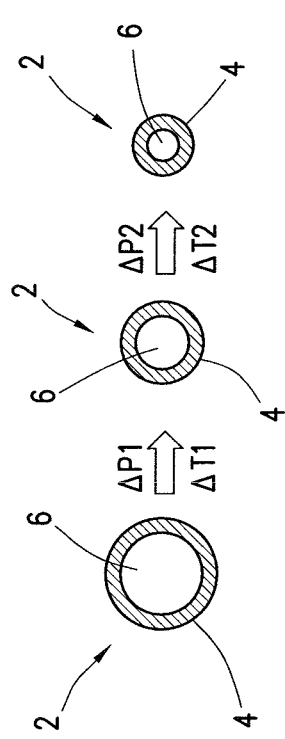
FIG. 1 illustrates change in volume of a hollow polymeric particulate in accordance with embodiments of the present technique.

Embodiments relate to well bore treatments and, more particularly, in certain embodiments, to use of polymeric particulates that are temperature activated to mitigate problems with annular pressure buildup in subterranean wells.

Embodiments of the treatment fluids may comprise polymeric particulates that are temperature activated. As defined herein, a "treatment fluid" is a fluid that is placed in a subterranean formation in order to perform a desired function. As used herein, the terms "treatment" and "treating" refer to any subterranean operation that uses a fluid in conjunction with performing a desired function and/or achieving a desired purpose. The terms "treatment" and "treating," as used herein, do not imply any particular action by the fluid or any particular component thereof unless otherwise specified. The treatment fluids may be any fluid that may, or is intended to, become trapped within well bore annulus after the completion of a subterranean cementing operation. In some embodiments, the treatment fluids may be a spacer fluid, a completion fluid, a drilling fluid, or a spotting fluid. A spotting fluid is typically a small volume of fluid placed into a well bore for a particular purpose or function. A spotting fluid may also be referred to as a "pill." Well bore treatments and use of the treatment fluids are described in more detail later in this application.

By including the polymeric particulates in the treatment fluids, problems associated with annular pressure buildup may be reduced. Embodiments of the polymeric particulates should reduce in volume when exposed to compressive forces at elevated temperatures when trapped in the well bore annulus. The polymeric particulate should maintain their shape (e.g., not collapse) at placement temperatures and pressures, but are temperature activated so when exposed to a temperature increase—such as during production—can compress upon application of a compressive force. When the compressive force is released, the polymeric particulates are capable of rebounding to their original shape and area and are therefore reusable for subsequent instances of annular pressure buildup. For example, the polymer particulates may rebound after release of the compressive force to at least about 50%, at least about 75%, at least about 90%, at least about 95%, or at least about 99% of their initial volume. In some embodiments, the compressive force may be generated by expansion of the treatment fluid in the well bore annulus due, for example, to a temperature rise. In additional embodiments, the compressive force may be generated by expansion of another fluid that is also trapped in the well bore annulus. In some embodiments, hydrocarbon production in the well bore may cause an increase in annular temperature thus causing expansion of the treatment fluid and/or another fluid trapped in the well bore annulus with the resultant compressive force. Without being limited by theory, it is believed that the reduction in volume of the polymeric particular should provide an amount of expansion volume in the well bore annulus. By providing an amount of expansion volume within the well bore annulus, it is believed that the pressure with the well bore annulus may be affected, for example, reduced or maintained at about a constant pressure.

Figure 2:
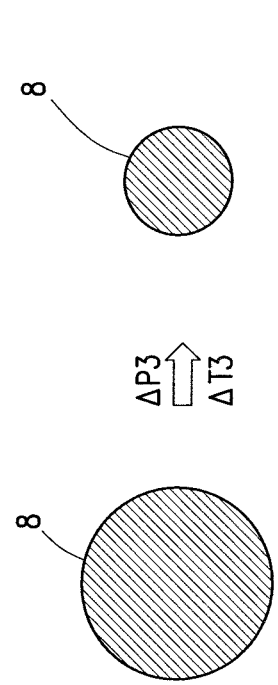
FIG. 2 illustrates change in volume of a foamed polymeric particulate in accordance with embodiments of the present technique.

Embodiments of the polymeric particulates may comprise a compressible fluid trapped in the particulate. Examples of compressible fluids include gases, such as air, nitrogen, and combinations thereof. In some embodiments, the polymeric particulates may be hollow particulates having an exterior shell and a compressible fluid trapped in an interior volume of the exterior shell. FIG. 1 illustrates collapse of a hollow particulate 2. As illustrated, the hollow particulate may have an exterior shell 4 and an interior volume 6. A compressible fluid may be trapped in the interior volume 6. The hollow particulate 2 may collapse and decrease in volume due to a pressure increase ($\Delta P$) caused by a temperature increase ($\Delta T$). In additional embodiments, the polymeric particulates may be a closed-cell foam having the compressible gas trapped in interior pockets. FIG. 2 illustrates collapse of a closed-cell foamed particulate 8 due to a pressure increase ($\Delta P$) caused by a temperature increase ($\Delta T$). In some embodiments, the temperature-activated particulate may comprise a polymeric foam, such as a polypropylene foam.

The polymeric particulates disclosed herein are referred to as "temperature activated" because they should maintain their shape and volume when exposed to regular well bore pressure and temperatures, but should compress when exposed to temperature increases (e.g., about 200° F. or greater) and compressive force. Because the polymeric particulates are temperature activated, they should maintain their initial shape and volume even when exposed to high pressures during initial placement because the temperatures are typically low, for example, ranging from about 80° F. to about 400° F. and, alternatively, from about 150° F. to about 300° F. For example, the polymeric particulates may be exposed to pressures ranging from 6,000 psi to 10,000 psi during their initial placement. If the polymeric particulate deform and/or fail/collapse during placement, they may be rendered inoperable for mitigation of subsequent annular pressure buildup. Thus, the polymeric particulates should be designed to withstand placement pressures without irreversible deformation. In some embodiments, the polymeric particulates should maintain at least about 95% of their initial volume after initial placement.

Because the polymeric particulates are temperature activated, temperature rises in the well bore after placement activate the particulates such that compressive forces will cause the polymeric particulates to reduce in volume. In general, the polymeric particulates should be designed so that they will be activated at temperatures ranging from about 200° F. to 300° F. and pressures ranging from 2,000 psi to 5,000 psi. For example, the polymeric particulates can be designed to withstand a compressive force of 5,000 psi at a temperature of 100° F., but will compress/elastically deform upon application of a compressive force of 5,000 psi at a temperature of 250° F. or greater. In embodiments, the polymeric particulates may compress to an average volume ranging from about 1% to about 99% of their original volume (e.g., prior to introduction in the well bore), from about 50% to about 99% of their original volume, or from about 1% to about 50% of their original volume. As previously mentioned, the polymeric particulates may rebound after release of the compressive force, for example, to at least about 50%, at least about 75%, at least about 90%, at least about 95%, or at least about 99% of their initial volume. In some instances, cycling of the polymeric particulates through more than 1 cycle of compression and rebound may result in a reduction in their rebound; however, embodiments of the polymeric particulates may continue to mitigate problems with annular pressure buildup.

A number of different factors may be considered during design of the temperature-activated polymeric particulates so that the polymeric particulates can withstand initial temperatures and pressures while still collapsing upon an increase in pressure due to a temperature rise, including, for example, glass transition temperature and/or wall thickness, among others. Glass transition temperature is the temperature at which the polymeric particulates should transition from a hard relatively rigid state into a more rubbery state in which the polymeric particulates are cable of elastic deformation. In general, the glass transition temperature of the polymeric particulates should be higher than the bottom hole circulating temperature ("BHCT") during placement, but close to the expected BHCT during production. For example, the glass transition temperature may be within 10° F. or less of the expected BHCT during production. In some embodiments, the methods may comprise selecting polymeric particulates based on BHCT. The glass transition temperature of a particular polymer may be varied the molecular weight of the polymer. If the glass transition temperature of the polymeric particulates is too high, the polymeric particulates may be too brittle and could even shatter or irreversibly deform when compressive force is applied. If the glass transition temperature of the polymeric particulates is too low, the polymeric particulates may be too elastic and experience deformation during initial placement. In some embodiments, the polymeric particulates may have a glass transition temperature ranging from about 200° F. and to about 600° F., alternatively from about 200° F. to about 300° F., and alternatively from about 200° F. to about 225° F. One of ordinary skill in the art, with the benefit of this disclosure, should be able to select a suitable glass transition temperature for a particular application.

Wall thickness of the polymeric particulates is another factor that may considered during design of certain embodiments of the polymeric particulates. The wall thickness may be selected so that the polymeric particulates can withstand initial temperatures and pressures while still collapsing upon an increase in pressure due to a temperature rise. In some embodiments, the polymeric particulates may have a wall thickness in a range of from about 50 nanometers microns to about 2 millimeters, and alternatively from about 100 microns to about 1 millimeters and, alternatively from about 500 microns to about 1 millimeter. One of ordinary skill in the art, with the benefit of this disclosure, should be able to select a suitable wall thickness for a particular application.

In addition to glass transition temperature and wall thickness, the stiffness or mechanical properties of the polymeric particulates can also be varied by making the polymer a co-polymer or a composite. For example, the polymer particulates may be fiber-reinforced to increase the particulates crush strength and, thus, ability to withstand initial placement pressures and temperatures. Examples of suitable fibers that may be used to reinforce the polymer particulates include glass fibers, carbon fibers, basalt fibers, and aromatic polyamide fibers (commonly referred to as "aramid" fibers). Co-polymers may also be used to vary the mechanical properties of the polymeric particulates.

The temperature-activated polymeric particulates may comprise any of a variety of different polymers which may be rigid at placement temperatures and pressures, but will activate upon a temperature rise in the well bore to be elastically deformable. Examples of polymers include, without limitation, polymers having one or more repeating units selected from the group consisting of polystyrenes, polyacrylates, polyacrylamides, cellulose, styrene butadiene rubbers, epoxys, and phenolics. Specific examples of suitable polymers include polystyrene, styrene-butadiene copolymers, polyfluorostyrene, polychlorostyrene, polydichlorostyrene, polybromostyrene, polypropylene, polypropylene oxide, polyp-phenylene terephthalamide, polyacrylamide, polycyclohexylacrylamide, polyisopropyl acrylamide, poly2-tert-butylacrylamide, polymethyl methacrylate, polyacrylate, polycyclohexyl acrylate, polybutyl acrylate, polyacrylic acid, polybenzyl methacrylate, polytrimethylsilyl methacrylate, polydiethylaminoethyl methacrylate, polyvinyl acetate, polyvinyl acetal, polythio-1,4-phenylene, polyvinyl ferrocene, polyvinyl pyridine, polyvinyl pyrrolidone, polyvinyl trifluoroacetate, nylon, polyacrylonitrile, polyacetoxystyrene, polyacenaphthylene, polybutadiene, polylactone, polybutyl vinyl ether, cellulose, cellulose nitrate, polychloroethylene, polychlorofluoroethylene, polyphenyl vinyl ketone, polyethylene, and polyethylcellulose. Embodiments of the polymeric particulate may include a homopolymer or a copolymer as suitable for a particular application. The polymeric particulates may be of any suitable size and configuration for use in a treatment fluid. In some embodiments, the polymeric particulates may have a particle size ranging from about 0.1 micron to about 20 millimeters. In some embodiments, the polymeric particulates may have generally spherical shapes, as shown on FIGS. 1 and 2. In other embodiments, the polymeric particulate may have non-spherical configurations (not shown).

In general, the polymeric particulates may be present in the treatment fluids in an amount sufficient to provide a desired amount of volume reduction upon collapse or reduction in volume. The amount of the polymeric particulates to use may be determined by taking into account a number of factors including, for example, the magnitude of the anticipated pressure buildup, volume of pressure relief that may be needed, and the volume in the well bore annulus for trapping the volume. In some embodiments, the polymeric particulates may be included in the treatment fluid in an amount in a range of from about 1% to about 60% by volume of the treatment fluid and, alternatively, from about 30% to about 60% by volume of the treatment fluid.

Embodiments of the treatment fluids may further comprise a carrier fluid. The carrier fluid may comprise an aqueous-based fluid or a nonaqueous-based fluid. Without limitation, examples of suitable aqueous-based fluids comprise fresh water, salt water (e.g., water containing one or more salts dissolved therein), brine (e.g., saturated salt water), seawater, water-based drilling fluids (e.g., water-based drilling fluid comprising additives such as clay additives), and combinations thereof. In some embodiments, the carrier fluid may comprise viscosified water. Examples of suitable nonaqueous-based fluids include without limitation diesel, crude oil, kerosene, aromatic mineral oils, non-aromatic mineral oils, linear alpha olefins, poly alpha olefins, internal or isomerized olefins, linear alpha benzene, esters, ethers, linear paraffins, and combinations thereof. For instance, the non-aqueous-based fluids may be blends such as internal olefin and ester blends. In some embodiments, the carrier fluid may be present in the treatment fluid in an amount sufficient to form a pumpable fluid. In other embodiments, the treatment fluid may comprise the carrier fluid in an amount in a range of from about 40% to about 99% by volume of the treatment fluid.

In some embodiments, the treatment fluid may also contain additional additives suitable for use with drilling fluids, spacer fluids, completion fluids, and/or spotting fluids. Examples of such additional additives include, without limitation, fluid loss control agents, weighting agents, viscosifiers, oxidizers, surfactants, dispersants, suspending agents, pH increasing materials, pH decreasing materials, lost circulation materials (LCMs), gelling agents, displacement facilitators, and combinations thereof. Examples of specific additives that may be included in the treatment fluids include, but are not limited to, vitrified shale, biopolymers (such as diutan, welangums, or biozan), clays, diatomaceous earth, metakaolin, silica, sand, silica fume, fly ash, slag, and organic acids (such as citric acid). In some embodiments, the treatment fluid may be foamed, for example, with a foaming surfactant and a gas.

Figure 3:
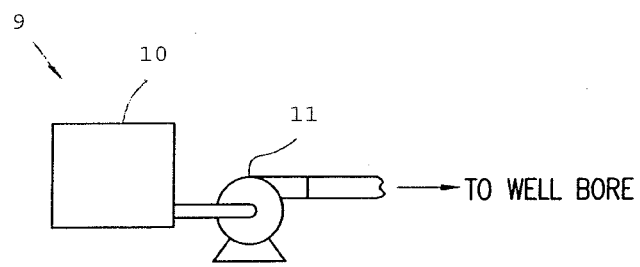
FIG. 3 illustrates a system for preparation and delivery of a treatment fluid to a well bore in accordance with embodiments of the present technique.

The components of the treatment fluids comprising the temperature-activated polymeric particulates may be combined in any order desired to form a treatment fluid that can be placed into a subterranean formation. In addition, the components of the treatment fluids may be combined using any mixing device compatible with the composition, including a bulk mixer, for example. FIG. 3 illustrates a system 9 for preparation of a treatment fluid and delivery to a well bore. As shown, the treatment fluid may be mixed in mixing equipment 10, such as mixer or recirculating tub, and then pumped via pump 11 to the well bore. In some embodiments, the polymeric particulates may be pre-blended with other dry additives of the treatment fluid and then mixed with the carrier fluid. In other embodiments, the polymeric particulates and the other dry additives may be separately added to the carrier fluid. In yet other embodiments, the polymeric particulates may be injected into the treatment fluid as it is being pumped downhole. Other suitable techniques may also be used for preparation of the treatment fluids as will be appreciated by those of ordinary skill in the art in accordance with example embodiments.

Figure 4:
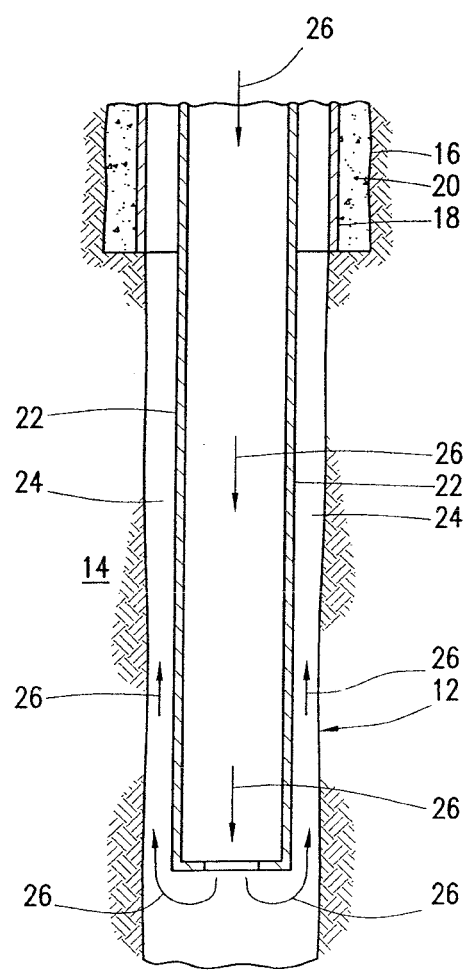
FIG. 4 illustrates placement of a treatment fluid into a well bore annulus in accordance with embodiments of the present technique.

Embodiments of the treatment fluids may be placed in well bore annulus in any suitable fashion. The well bore annulus will be an annulus between a pipe string (e.g., casing, tubing, etc.) and a subterranean formation and/or between a pipe string and a larger conduit in the well bore. For example, the treatment fluids may be placed into the well bore annulus directly from the surface. Alternatively, the treatment fluids may be flowed into a well bore via the casing and permitted to circulate into place in a well bore annulus between the casing and the subterranean formation or between the casing and a large conduit. FIG. 4 illustrates placement of the treatment fluid into a well bore 12 in accordance with example embodiments. As illustrated, the well bore 12 may be drilled into the subterranean formation 14. While well bore 12 is shown extending generally vertically into the subterranean formation 14, example embodiments are also applicable to well bores that extend at an angle through the subterranean formation 14, such as horizontal and slanted well bores. The well bore 12 comprises walls 16. As illustrated, a surface casing 18 has been inserted into the well bore 12. The surface casing 18 may be cemented to the walls 16 of the well bore 12 by cement sheath 20. In the illustrated embodiment, one or more additional pipe strings, shown here as casing 22 may also be disposed in the well bore 12. As illustrated, there is a well bore annulus 24 formed between the casing 22 and the walls 16 of the well bore 12 and/or the surface casing 18. Embodiments of the treatment fluids may be prepared by a variety of methods as will be apparent to those of ordinary skill. The treatment fluid may then be pumped down the casing 22, as shown in FIG. 4 by directional arrows 26. The treatment fluid may be allowed to flow down through the bottom of the casing 22 and up around the casing 22 into the well bore annulus 24.

Embodiments of the treatment fluids may be used in various wellbore servicing operations. For instance, the treatment fluid may be a spacer fluid, a drilling fluid, a completion fluid such as a cement composition, or a spotting fluid. In accordance with present embodiments, the treatment fluid may be placed into a well bore annulus. Generally, an operator may circulate one or more additional fluids (e.g., a cement composition) into place within the subterranean annulus behind embodiments of the treatment fluids. At least a portion of embodiments of the treatment fluids then may become trapped within the well bore annulus. In some embodiments, at least a portion of the treatment fluid may become trapped at a point in time after a cement composition has been circulated into a desired position within the annulus to the operator's satisfaction. At least a portion of the polymeric particles of the example well fluids may collapse or reduce in volume so as to affect the pressure in the well bore annulus. For example, if the temperature in the well bore annulus should increase after the onset of hydrocarbon production from the subterranean formation, at least a portion of the polymeric particulates may collapse or reduce in volume so as to desirably mitigate, or prevent, an undesirable buildup of pressure within the annulus.

An example of a method includes a method of servicing a well bore comprising the steps of: providing a treatment fluid that comprises a carrier fluid and temperature-activated polymeric particulates; and introducing the treatment fluid into a well bore annulus. Additional method steps may include one or more of: using the treatment fluid to displace a drilling fluid from the well bore annulus; introducing a cement composition into the well bore annulus, wherein the treatment fluid separates the cement composition from the drilling fluid; allowing the cement composition to set in the well bore annulus; or allowing at least a portion of the treatment fluid to become trapped in the well bore annulus. In certain exemplary embodiments, the treatment fluid may become trapped in the well bore annulus, for example, after the treatment fluid has been placed into the well bore annulus. In alternative embodiments, the treatment fluid may be a drilling fluid that is circulated in a well bore annulus while drilling the well bore. At least a portion of the drilling fluid may be left in the well bore after drilling operations are complete. In such alternative embodiments, the treatment fluid may be used as a carrier for the polymeric particulates, which may be used to prevent the pressure increase. The polymeric particulates can be added to the treatment fluid instead of a spacer fluid, for example. In some embodiments, the polymeric particulates may be added to a tail end of the drilling fluid that, for example, may be intended to be left in the well bore annulus.

Figure 5:
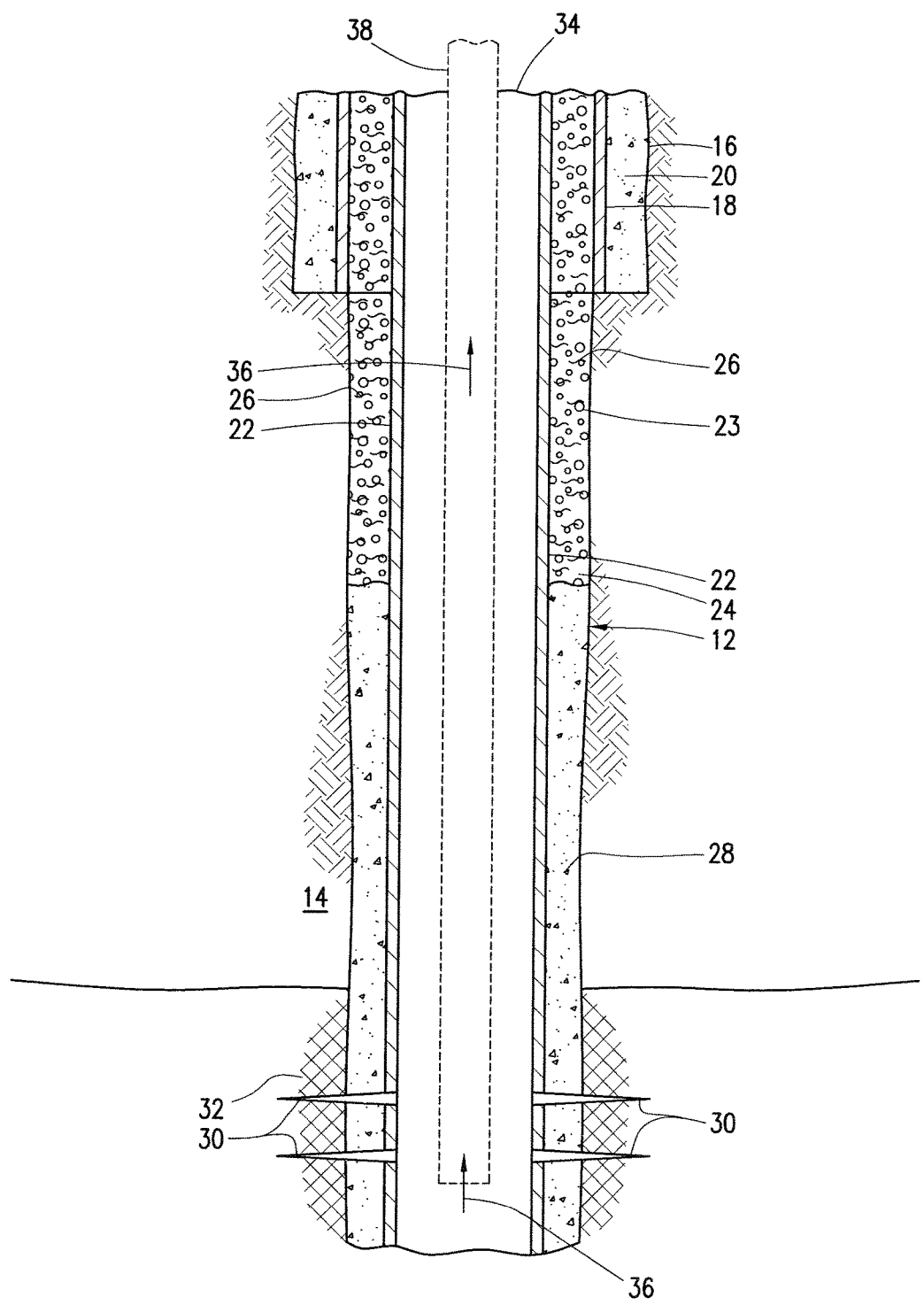
FIG. 5 illustrates a spacer fluid trapped in a well bore annulus in accordance with embodiments of the present technique.

FIG. 5 illustrates a well bore 12 that has been treated using polymeric particulates 23 in accordance with example embodiments. As illustrated, the spacer fluid 26 and a cement sheath 28 may be disposed in the well bore annulus 24. At least a portion of the spacer fluid 26 may contain polymeric particulates 23 that are temperature activated. In the illustrated embodiment, the spacer fluid 26 is disposed in the well bore 12 above the cement sheath 28. As previously mentioned, the well bore annulus 24 may be closed such that the spacer fluid 26 and the cement sheath may be trapped in the well bore annulus 24, the well bore annulus 24 having a fixed volume. Hydrocarbon production may be initiated from the well bore 12 at some point in time after the cementing operation is complete. As illustrated, apertures 30 in the cement sheath 28 and the casing 22 may allow hydrocarbons to flow from a producing zone 32 of the subterranean formation 14 up through the casing 22 and to a surface 34, as illustrated by arrows 36. While not Production tubing 38 may be disposed in the casing 22 to provide a conduit for passage of the hydrocarbons. As previously mentioned, the hydrocarbons may be at elevated temperatures as they flow up through the casing 22 causing fluids, such as spacer fluid 26, to heat and expand. Such an expansion may cause an increase in pressure within the well bore annulus 24 when the volume is fixed, for example. At least a portion of the polymeric particulates 23 in the spacer fluid 26 may collapse or reduce in volume so as to desirably mitigate, or prevent, an undesirable buildup of pressure within the annulus.

The exemplary polymeric particulates/treatment fluids disclosed herein may directly or indirectly affect one or more components or pieces of equipment associated with the preparation, delivery, recapture, recycling, reuse, and/or disposal of the disclosed polymeric particulates. For example, the disclosed polymeric particulates/treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary polymeric particulates/treatment fluids. The disclosed polymeric particulates/treatment fluids may also directly or indirectly affect any transport or delivery equipment used to convey the polymeric particulates/treatment fluids to a well site or downhole such as, for example, any transport vessels, conduits, pipelines, trucks, tubulars, and/or pipes used to compositionally move the polymeric particulates/treatment fluids from one location to another, any pumps, compressors, or motors (e.g., topside or downhole) used to drive the polymeric particulates/treatment fluids into motion, any valves or related joints used to regulate the pressure or flow rate of the polymeric particulates/treatment fluids, and any sensors (i.e., pressure and temperature), gauges, and/or combinations thereof, and the like. The disclosed polymeric particulates/treatment fluids may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present invention, the following examples of certain aspects of some embodiments are given. In no way should the following examples be read to limit, or define, the entire scope of the invention.

Example 1

Figure 6:
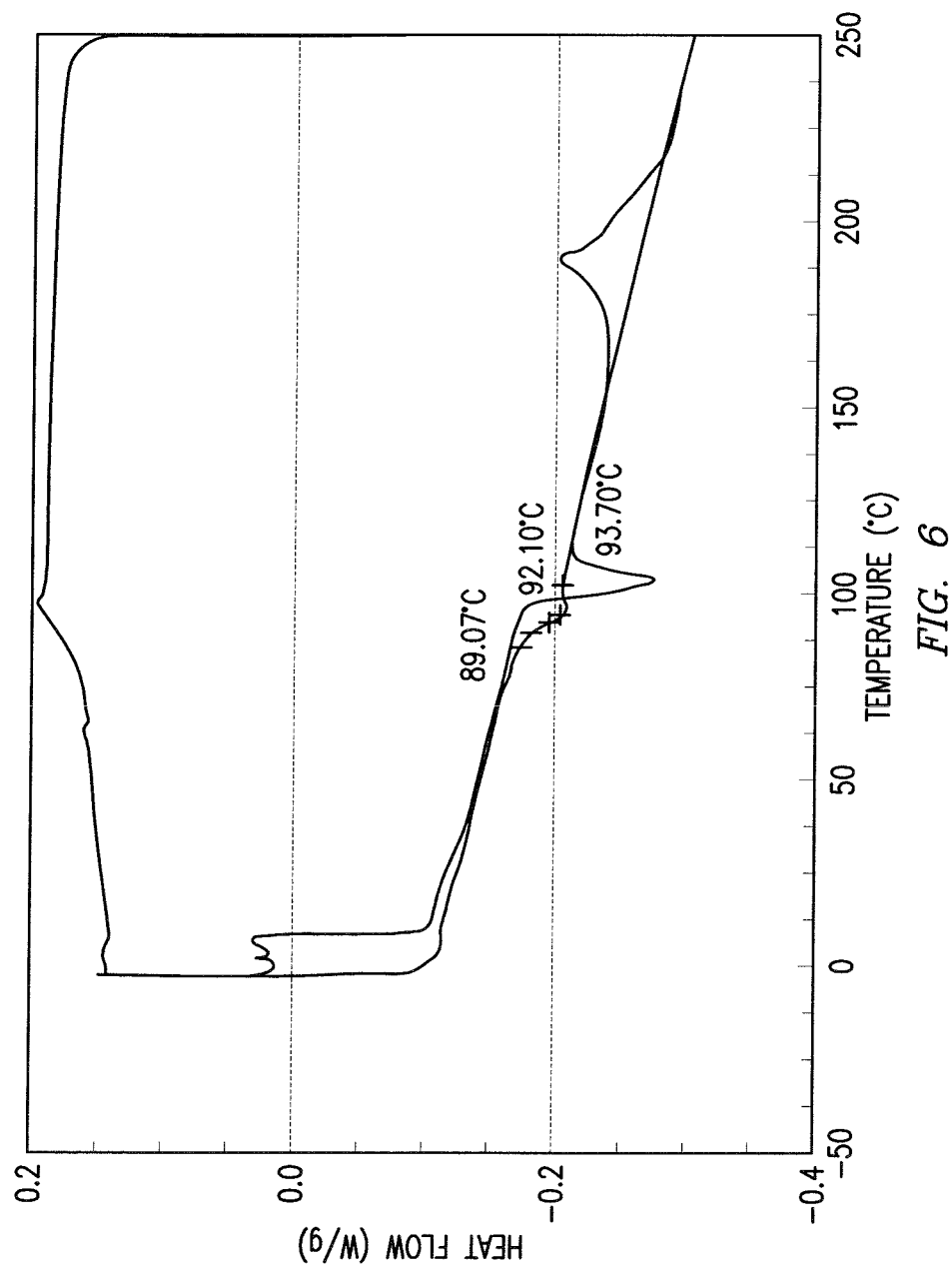
FIG. 6 illustrates a differential scanning calorimetry curve for an example embodiment of polystyrene particulates.
Figure 7:
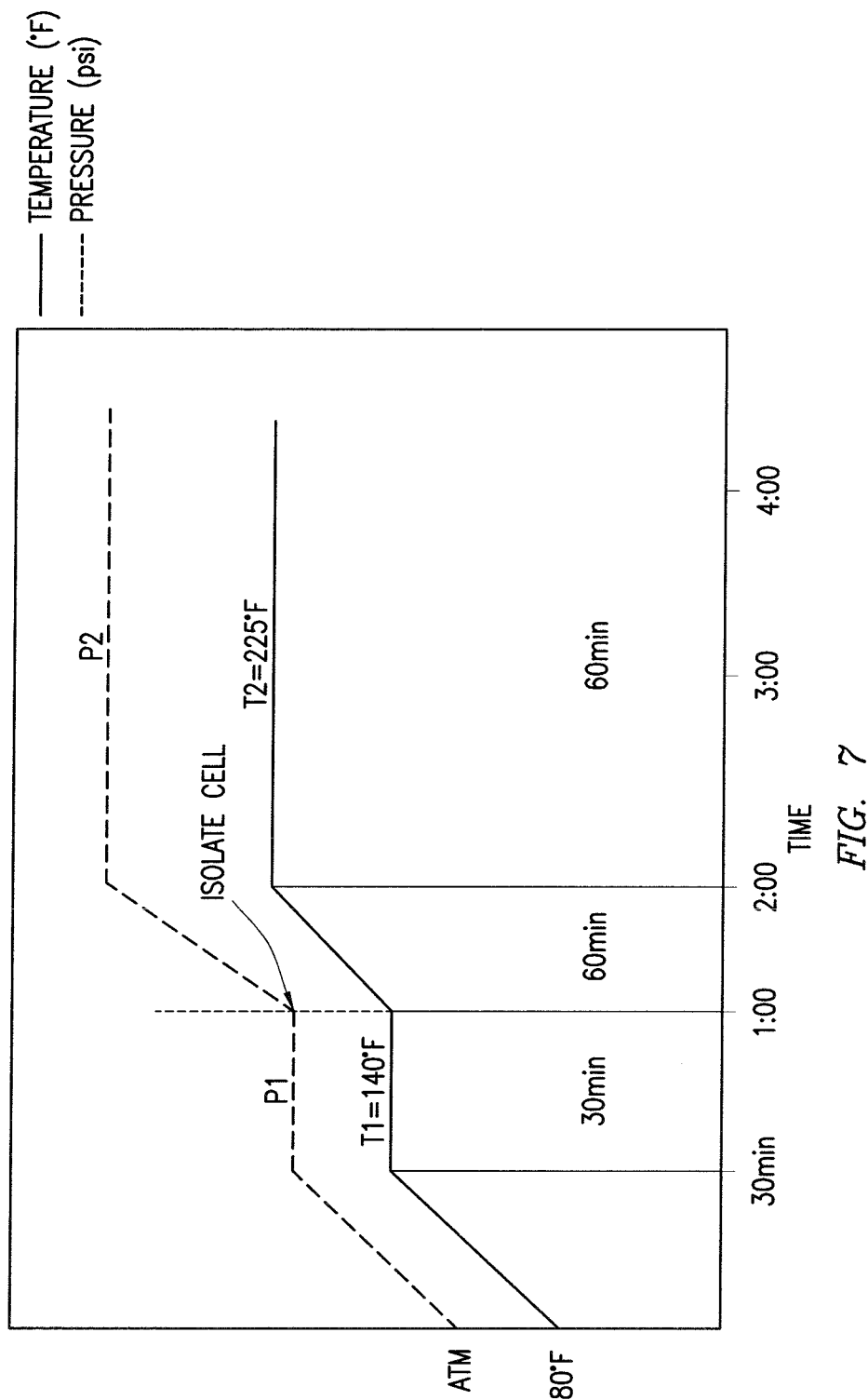
FIG. 7 illustrates a test schedule simulating well conditions in accordance with embodiments of the present technique.

The following example was performed to evaluate the ability of temperature-activated polymer particulates to mitigate annular pressure buildup. The temperature-activated polymeric particulates used in this example are hollow polystyrene particulates. Differential Scanning calorimetry (DSC) analysis revealed that the polystyrene in the particulates had a glass transition temperature of 200.7° F. FIG. 6 is a DSC curve showing heat flow versus temperature for the polystyrene particulates. The polystyrene particulates have a 565 microns+/−100 micron particle size. The manufacturer of the polystyrene particulates is Syntheon, Inc. The polystyrene particulates were added to a sample spacer fluid and were tested under the simulation of an annular pressure buildup (Tests 1-4). A 4265 HT high temperature Ultrasonic Cement Analyzer (UCA) run with Chandler Engineering Model 5270 data acquisition software from Chandler Engineering was used. In operation, the UCA can be locked-in during a test, and the UCA can monitor pressure variances generated by other mechanisms apart from the machine itself (e.g., temperature induced). In addition, a test schedule was created to simulate the temperature cycles that may be associated with a producing well. The test schedule was then entered into the UCA. FIG. 7 illustrates the UCA test schedule that was used to simulate actual well conditions. Each test schedule began at an initial temperature of 80° F. and atmospheric pressure. The temperature was then ramped to 140° F. over 30 minutes. The temperature of 140° F. was then maintained for 30 minutes. A temperature ramp to 225° F. over 60 minutes was then initiated. The temperature of 225° F. was then maintained for 60 minutes. This was the schedule used for both test compositions described in Table 1.

For each test, a sample fluid was prepared and tested for annular pressure buildup. Test 1 was a control without addition of the polystyrene particulates. Test 2 included the polystyrene particulates. The formulations for each test are set forth in the table below. In the table below, "% by wt" is the percent of the additive by the combined weight the Tuned® Spacer III Cement Spacer and the barite. Tuned® Spacer III Cement Spacer is a solid additive mixture that can be combined with water to form a water-based spacer fluid.

TABLE 1

|  | Control Test 1 | | 240 g Polystyrene Particulates Test 2 | |
| --- | --- | --- | --- | --- |
|  | Mass (g) | % by wt | Mass (g) | % by wt |
| Tuned ® Spacer III Cement Spacer | 31.2 | 15.9 | 31.2 | 15.9 |
| Barite | 164.9 | 84.1 | 164.9 | 84.1 |
| Polystyrene Particulates | 0 | 0 | 98.1 | 50.0 |
| Fresh Water | 307.2 | 157 | 209.2 | 107 |

The testing procedure was as follows:
1. The sample fluid was poured into the test cell and placed in UCA.
2. The temperature was increased to an initial temperature (T1) of 140° F.
3. A pressure, P1, was set on the test volume by varying the water pressure on the UCA cell.
4. The UCA cell was isolated from any volume leakage by closing the vent valve from the UCA cell to the environment.
5. The temperature was increased from T1 (140° F.) to a second temperature (T2) of 225° F.
6. The pressure was monitored and measured at various stages until T2 was reached.

7. Once T2 was reached, the pressure was observed until it stabilized and this stabilized value was recorded as P2.

Figure 8:
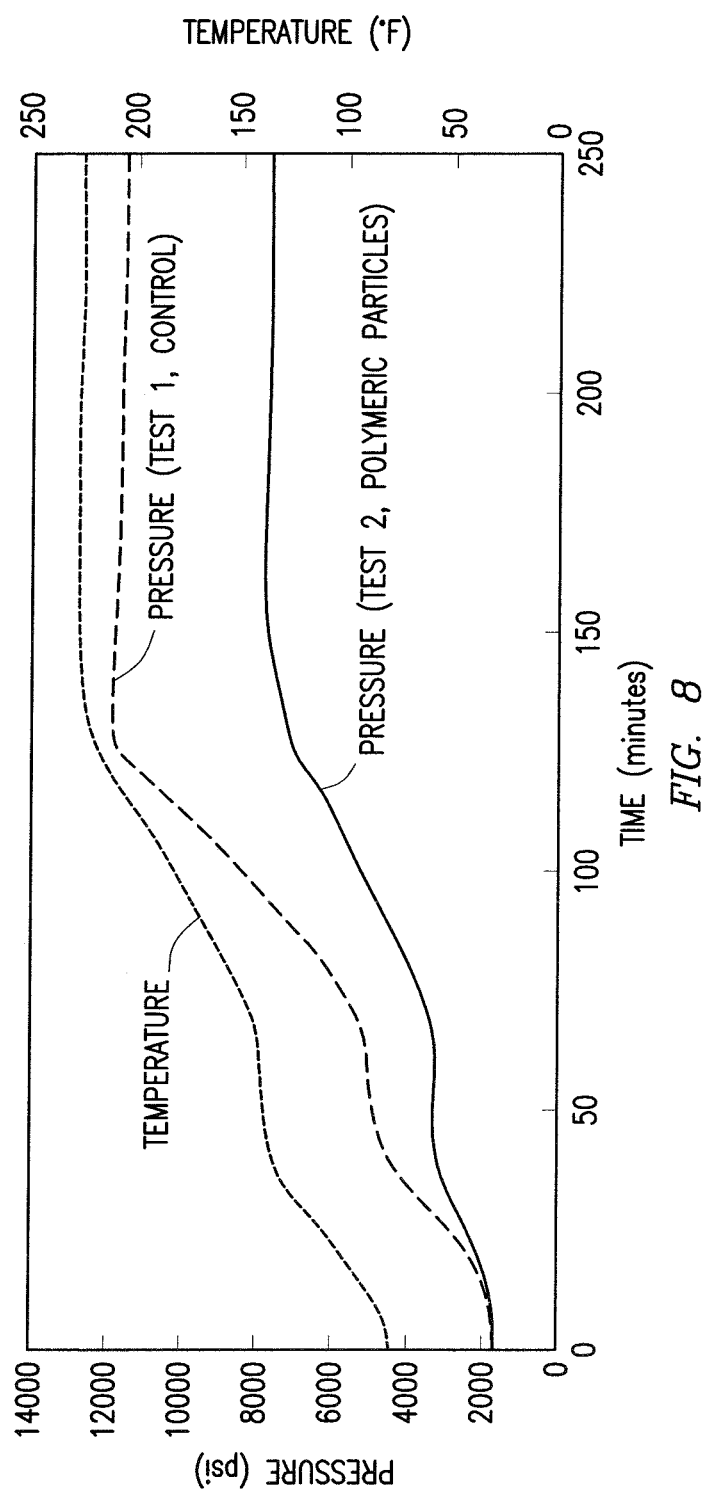
FIG. 8 illustrates pressure-temperature response data for various sample fluids in accordance with embodiments of the present technique.

The results of these tests are shown on FIG. 8. A comparison of Test 2 to Test 1, which did not include the polystyrene particulates, illustrates the effects of the polystyrene particulates in mitigating pressure buildup. It can be seen from FIG. 8 that Test 2 with the polystyrene particulates provided for less pressure buildup than Test 1 without the polystyrene particulates. Test 1 had a pressure increase of about 6,500 psi due to a temperature increase of 85° F. (from 140° F. to 225° F.). However, the use of polystyrene particulates in Test 2 reduced the ultimate pressure increase to a much lower value of about 300 psi (about 60% of the control). Thus the increase in pressure during hydrocarbon production can be reduced by more than ⅓ of the control. Advantageously, this reduction in pressure increase could prevent a casing collapse when the well is put on production.

Example 2

Figure 9:
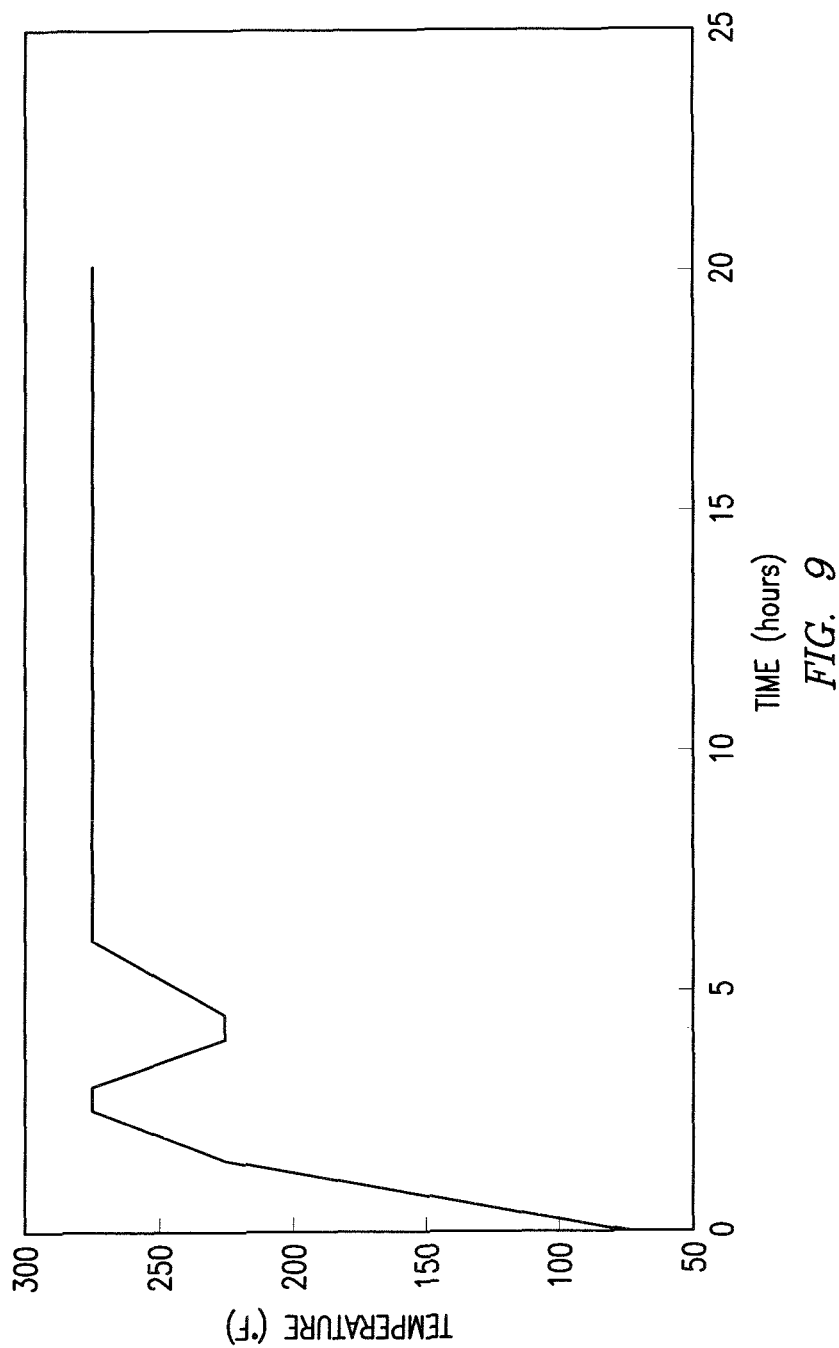
FIG. 9 illustrates an alternative test schedule simulating well conditions in accordance with embodiments of the present technique.

The following example was performed to evaluate the ability of temperature-activated polymer particulates to demonstrate the reversibility of this pressure mitigation with polystyrene. The polystyrene particulates from Example 1 were used for the example. As describe previously, the particulates are hollow polystyrene particulates. The polystyrene particulates were added to a sample spacer fluid and were tested under the simulation of an annular pressure buildup (Tests 3, 4). A 4265 HT high temperature Ultrasonic Cement Analyzer (UCA) run with Chandler Engineering Model 5270 data acquisition software from Chandler Engineering was used. FIG. 9 illustrates the UCA test schedule that was used to simulate actual well conditions for both test compositions described in Table 2.

For each test, a sample fluid was prepared and tested for annular pressure buildup. The formulations that were tested for each test are set forth in the table below. Test 3 was a control without the addition of any polystyrene particulates. Test 4 included the polystyrene particulates. In the table below, "% by wt" is the percent of the additive by the combined weight the Tuned® Spacer III Cement Spacer and the barite.

TABLE 2

|  | Control Test 3 | | 50% Polystyrene Particulates Test 4 | |
| --- | --- | --- | --- | --- |
|  | Mass (g) | % by wt | Mass (g) | % by wt |
| Tuned ® Spacer III Cement Spacer | 31.2 | 15.9 | 31.2 | 15.9 |
| Barite | 165 | 84.1 | 165 | 84.1 |
| Polystyrene Particulates | 0 | 0 | 98.1 | 50.0 |
| Fresh Water | 307 | 157 | 209 | 107 |

The testing procedure was as follows:
1. The sample fluid was poured into the test cell and placed in UCA.
2. The temperature was increased to an initial temperature (T1) of 140° F.
3. A pressure, P1, was set on the test volume by varying the water pressure on the UCA cell.
4. The UCA cell was isolated from any volume leakage by closing the vent valve from the UCA cell to the environment.
5. The temperature was increased from T1 (140° F.) to a second temperature (T2) of 225° F.
6. The pressure was monitored and measured at various stages until T2 was reached.
7. Once T2 was reached, the pressure was observed until it stabilized and this stabilized value was recorded as P2.
8. The temperature was decreased back to T1 (140° F.) and pressure was allowed to stabilize at this temperature.
9. The temperature was then increased to T2 (225° F.) and allow to stabilize at this temperature.

Figure 10:
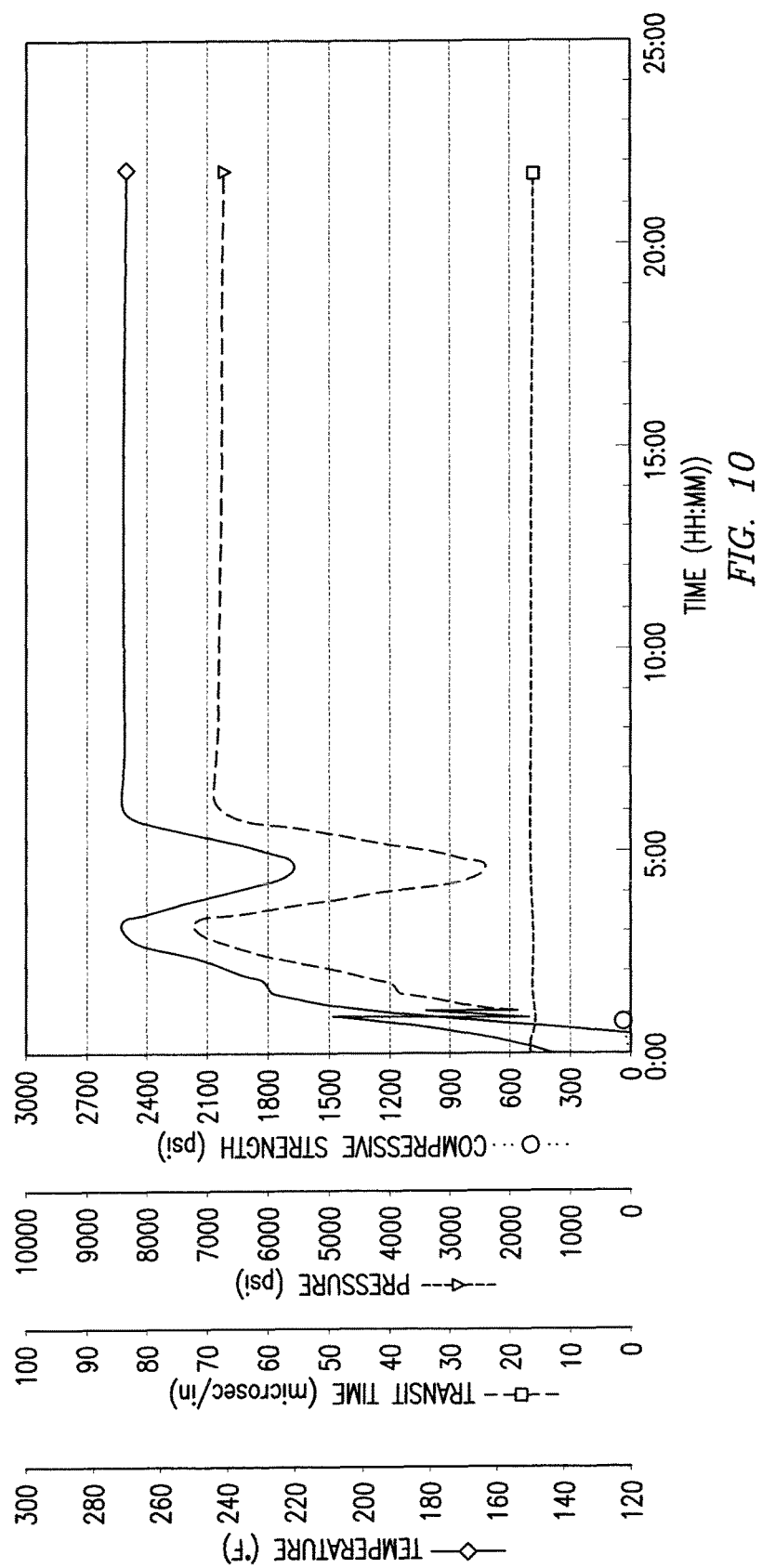
FIG. 10 illustrates pressure-temperature response data for a sample fluid in accordance with embodiments of the present technique.

The result of Test 4 is shown on FIG. 10 for one and a half thermal cycles. As illustrated, the pressure at T2 is the same for the first time that T2 is reached as for the second time. This indicates that the polymer has reversibility. It can last beyond one compressive event. This is particularly important in a situation where the temperature of the well is variable and oscillates between two temperatures.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of servicing a well bore comprising:
providing a treatment fluid comprising a carrier fluid and temperature-activated polymeric particulates, wherein the temperature-activated polymeric particulates comprise at least one polymeric material selected from the group consisting of polystyrene, styrene-butadiene copolymers, polyfluorostyrene, polychlorostyrene, polydichlorostyrene, and polybromostyrene; and
introducing the treatment fluid into a well bore annulus, wherein the temperature activated particulates have a selected glass transition temperature and wall thickness such that the temperature activated particulates withstand an initial temperature and pressure during an initial placement of the temperature-activated particulates into the well bore annulus such that the temperature-activated particulates maintain at least about 95% of their initial volume during the initial placement, wherein the initial volume is the volume of the temperature-activated particulates prior to the introducing; wherein the wall thickness is in a range from about 100 microns to about 1 millimeter.

2. The method of claim 1, wherein the treatment fluid is used to displace a drilling fluid from the well bore annulus.

3. The method of claim 2, further comprising introducing a cement composition into the well bore annulus, wherein the treatment fluid separates the cement composition from the drilling fluid.

4. The method of claim 1, wherein at least a portion of the temperature-activated polymer particulates reduces in volume to affect annular pressure in response to a compressive force due to a temperature increase in the well bore annulus.

5. The method of claim 4, wherein the temperature increase is to a temperature of about 200° F. or greater.

6. The method of claim 4, wherein the at least a portion of the temperature-activated polymeric particulates rebound after release of the compressive force to at least about 50% of the initial volume.

7. The method of claim 1, further comprising allowing at least a portion of the treatment fluid to become trapped in the well bore annulus.

8. The method of claim 1, wherein the temperature-activated polymeric particulates have a glass transition temperature in a range of from about 200° F. to about 600° F.

9. The method of claim 1, wherein the temperature-activated polymeric particulates comprise an exterior shell and an interior volume, wherein a compressible gas is trapped in the interior volume.

10. The method of claim 1, wherein the temperature-activated particulates comprise fiber-reinforced particulates.

11. The method of claim 1, wherein the temperature-activated polymeric particulates are present in the treatment fluid in an amount in a range of from about 1% to about 50% by volume of the treatment fluid.

12. The method of claim 1 wherein the glass transition temperature of the temperature-activated particulates is within 10° F. or less of a bottomhole circulating temperature during production.

13. A method of servicing a well bore comprising:
selecting temperature-activated polymeric particulates based on a bottom hole circulating temperature of the well bore;
providing a treatment fluid comprising a carrier fluid and the temperature-activated polymeric particulates having an initial volume, wherein the temperature-activated polymeric particulates comprise an exterior shell and an interior volume, wherein a compressible gas is trapped in the interior volume; and
introducing the treatment fluid into a well bore annulus, wherein the temperature-activated polymeric particulates have a selected glass transition temperature and wall thickness such that the temperature activated particulates withstand an initial temperature and pressure during an initial placement of the temperature-activated particulates into the well bore annulus such that the temperature-activated particulates maintain at least about 95% of their initial volume during the initial placement, wherein the initial volume is the volume of the temperature-activated particulates prior to the introducing; wherein the wall thickness is in a range from about 100 microns to about 1 millimeter;
wherein the temperature-activated particulates are temperature activated such that temperature rises that are above the glass transition temperature and occur after the initial placement activate the temperature-activated particulates such that compressive forces will then cause the temperature-activates particulates to reduce in volume.

14. The method of claim 13, further comprising:
using the treatment fluid to displace a drilling fluid from the well bore annulus;
introducing a cement composition into the well bore annulus, wherein the treatment fluid separates the cement composition from the drilling fluid; and
allowing at least a portion of the treatment fluid to become trapped in the well bore annulus.

15. The method of claim 13, wherein at least a portion of the temperature-activated polymer particulates reduces in volume to affect annular pressure in response to a compressive force due to a temperature increase in the well bore annulus.

16. The method of claim 13, wherein the glass transition temperature of the temperature-activated polymeric particulates is in a range of from about 200° F. to about 600° F., and wherein the temperature-activated polymeric particulates comprise at least one polymeric material selected from the group consisting of polystyrene, styrene-butadiene copolymers, polyfluorostyrene, polychlorostyrene, polydichlorostyrene, polybromostyrene, polypropylene, polypropylene oxide, polyp-phenylene terephthalamide, polyacrylamide, polycyclohexylacrylamide, polyisopropyl acrylamide, poly2-tert-butylacrylamide, polymethyl methacrylate, polyacrylate, polycyclohexyl acrylate, polybutyl acrylate, polyacrylic acid, polybenzyl methacrylate, polytrimethylsilyl methacrylate, polydiethylaminoethyl methacrylate, polyvinyl acetate, polyvinyl acetal, polythio-1,4-phenylene, polyvinyl ferrocene, polyvinyl pyridine, polyvinyl pyrrolidone, polyvinyl trifluoroacetate, nylon, polyacrylonitrile, polyacetoxystyrene, polyacenaphthylene, polybutadiene, polylactone, polybutyl vinyl ether, cellulose, cellulose nitrate, polychloroethylene, polychlorofluoroethylene, polyphenyl vinyl ketone, polyethylene, and polyethylcellulose.

17. The method of claim 13 wherein the glass transition temperature of the temperature-activated particulates is within 10° F. or less of a bottomhole circulating temperature during production.

18. The method of claim 13, wherein the temperature-activated particulates are selected to have a glass transition temperature that is higher than bottom hole circulating temperature during placement and within about 10° F. or less of bottom hole circulating temperature during production.

19. A well treating system comprising:
a treatment fluid comprising:
- a carrier fluid; and
- temperature-activated polymeric particulates having an initial volume and a glass transition temperature in a range of from about 200° F. to about 600° F., wherein the temperature-activated polymeric particulates comprise at least one polymeric material selected from the group consisting of polystyrene, styrene-butadiene copolymers, polyfluorostyrene, polychlorostyrene, polydichlorostyrene, and polybromostyrene; wherein the temperature-activated polymeric particulates have a selected glass transition temperature and wall thickness such that the temperature activated particulates withstand an initial temperature and pressure during an initial placement of the temperature-activated particulates into a well bore annulus such that the temperature-activated particulates maintain at least about 95% of their initial volume during the initial placement; wherein the wall thickness is in a range from about 100 microns to about 1 millimeter.

20. The well treating system of claim 19 further comprising mixing equipment for mixing the treatment fluid, and pumping equipment for delivering the treatment fluid into a well bore.

\* \* \* \* \*